No. 652,860. Patented July 3, 1900.
T. J. PERRIN.
DETACHABLE TAPER CUTTING ATTACHMENT FOR LATHES.
(Application filed Nov. 7, 1899.)

(No Model.) 3 Sheets—Sheet 1.

No. 652,860. Patented July 3, 1900.
T. J. PERRIN.
DETACHABLE TAPER CUTTING ATTACHMENT FOR LATHES.
(Application filed Nov. 7, 1899.)

(No Model.) 3 Sheets—Sheet 2.

No. 652,860. Patented July 3, 1900.
T. J. PERRIN.
DETACHABLE TAPER CUTTING ATTACHMENT FOR LATHES.
(Application filed Nov. 7, 1899.)
(No Model.) 3 Sheets—Sheet 3.

WITNESSES:
Carl Rowe,
C. Theobald.

T. J. Perrin.
INVENTOR,
By R. J. McCarty
his ATTORNEY.

UNITED STATES PATENT OFFICE.

THOMAS J. PERRIN, OF DAYTON, OHIO.

DETACHABLE TAPER-CUTTING ATTACHMENT FOR LATHES.

SPECIFICATION forming part of Letters Patent No. 652,860, dated July 3, 1900.

Application filed November 7, 1899. Serial No. 736,116. (No model.)

*To all whom it may concern:*

Be it known that I, THOMAS J. PERRIN, a citizen of the United States, residing at Dayton, in the county of Montgomery and State of Ohio, have invented certain new and useful Detachable Taper-Cutting Attachments for Lathes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention comprises a detachable taper-cutting attachment for lathes.

One object of the invention is to provide an attachment for cutting any-degree tapers and which may be attached to and detached from any lathe instantaneously and which is applicable to all kinds of chuckwork and may be adapted for all kinds of taper-work on the centers without departing from the main features of the invention.

A further object of the invention is to provide an attachment of the above character which is capable of boring a straight aperture or any inside taper.

The attachment may be manufactured independently of any lathe construction and yet be applicable to any lathe.

Figure 1:
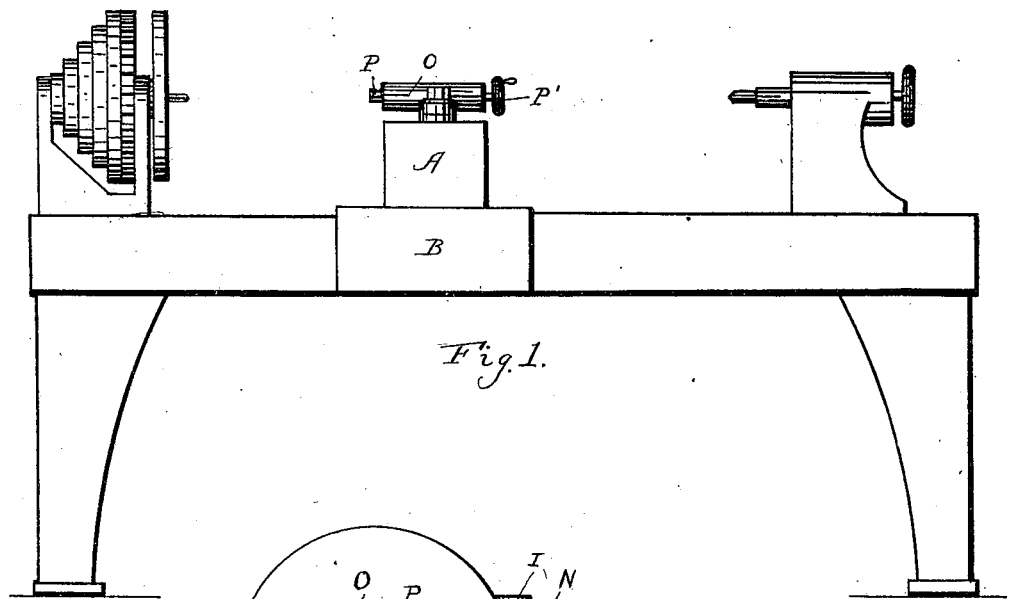
Figure 2:
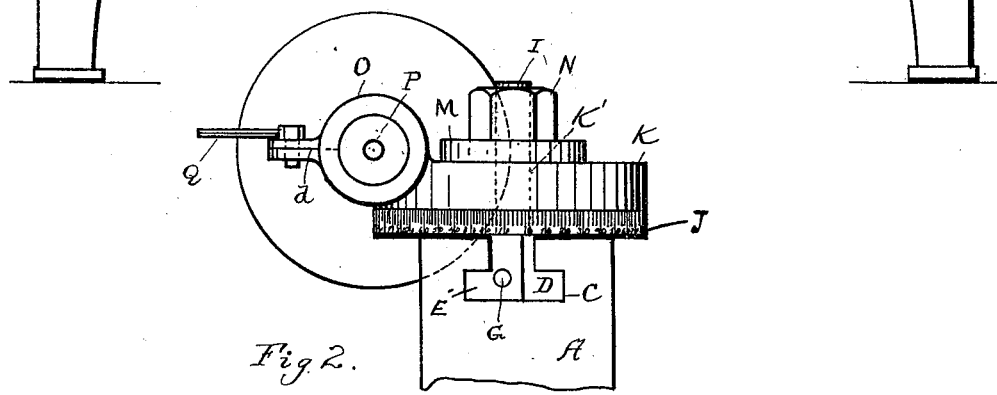
Figure 3:
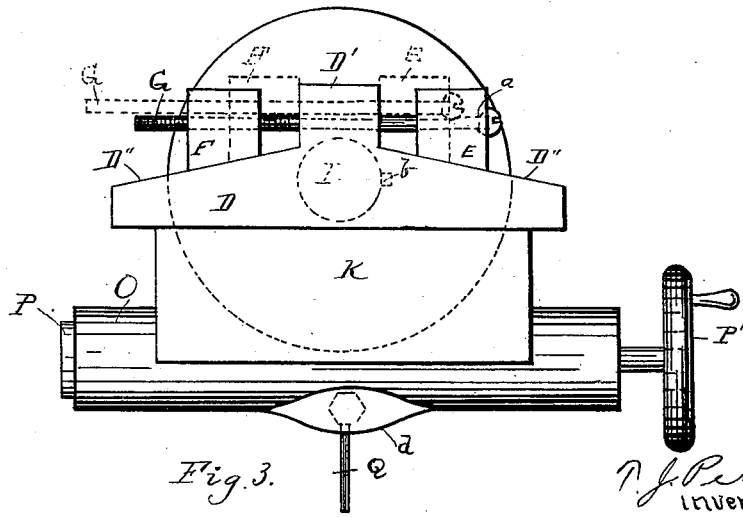
Figure 4:
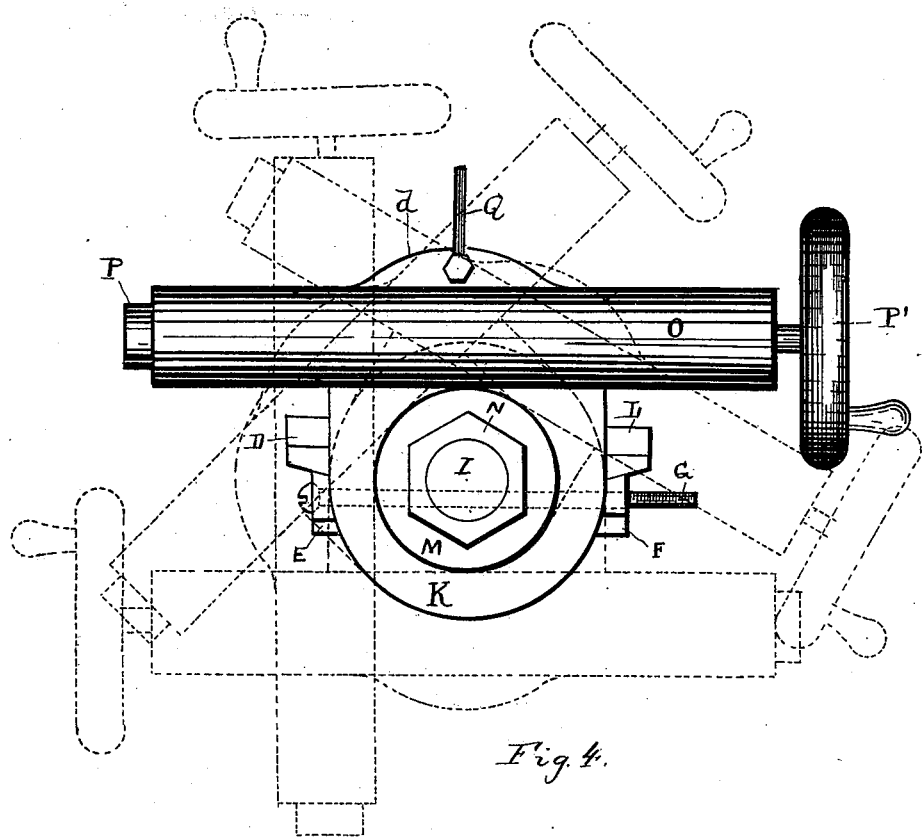
Figure 5:
Figure 6:
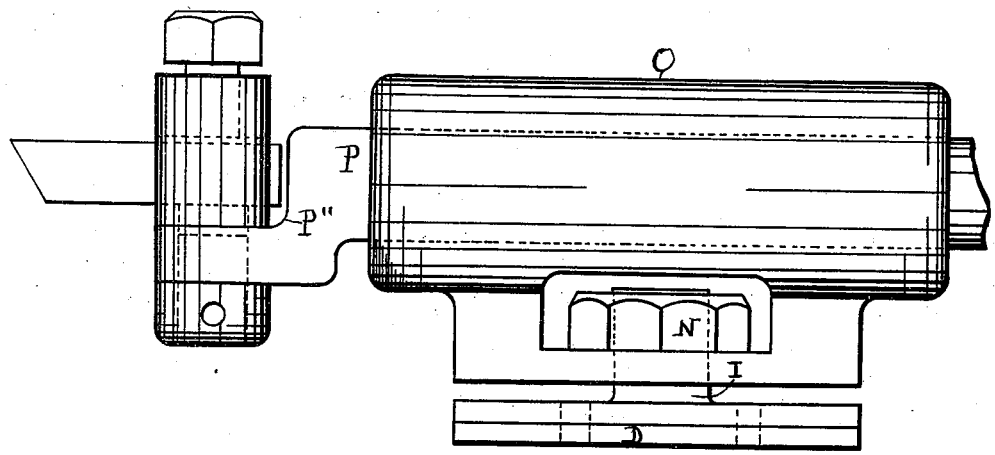
Figure 7:
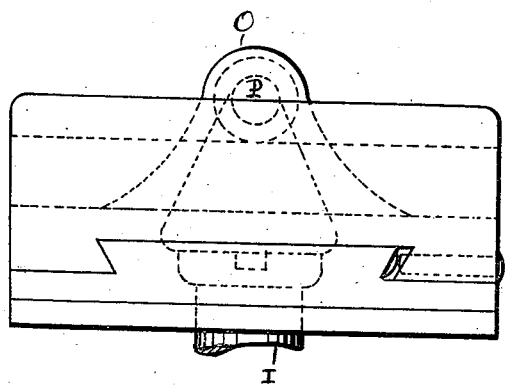

In the accompanying drawings, Figure 1 is a side elevation of a lathe having my attachment detachably secured to the carriage. Fig. 2 is an enlarged end elevation of the attachment, showing the spindle with aperture for holding the tool. Fig. 3 is a bottom plan view of the attachment. Fig. 4 is a top plan view of the attachment, showing in dotted lines the range of degrees of adjustment. The full lines represent the attachment in position parallel with the centers, which enables the boring of a straight hole. Fig. 5 is a view of the draw-bolt. Fig. 6 is a side elevation of my invention adapted to center-work. Fig. 7 is a front elevation of the same.

In applying the attachment to a lathe the tool-post is first removed by sliding it out of the holder A on the carriage B. The groove or T-slot C in the holder A is utilized for this attachment by means of an adjustable T-shaped expander or holder, which secures the attachment to the tool-holder on the lathe-carriage and consists of parts D, E, and F, the former one of which has a lug D' with an elongated aperture and two tapering sides D'' D'', which extend from the ends to the lug D'. Riding against the surfaces D'' D'' are the friction-pieces E and F, which have tapering surfaces which engage with the piece D. The friction-pieces E and F have openings through them. The opening in the latter is threaded. Passing through said pieces E and F and through the lug D' and screwing into piece F is a draw-bolt G, which is partially threaded. The special construction of this bolt is shown in Fig. 5, where it will be seen to have a tapering shoulder $a$, which enters a corresponding counterbore in the opening in block E. By means of this construction the friction-pieces E and F when the bolt is tightened are moved toward the center, thus riding up on the surfaces D' and expanding the width of the holder or binder, which, as before stated, consists of the pieces D, E, and F, and securely holding in place the attachment, thereby locating said attachment and enabling it to be set at any degree in the circle.

I designates a bolt or stem which may be an integral part of the piece D, as shown in the drawings, or it may be screwed into the piece D or attached in any other way, so as to enable the binding parts to be detachable from the lathe tool-holder A.

J is a disk graduated on its entire periphery with the three hundred and sixty degrees. This disk fits over the bolt or stem I and is located by a key $b$. Said key may be either on the bolt or stem I or on the expanding piece D. In the event that the bolt I is screwed into the piece D the said bolt would necessarily be provided with a head instead of a removable nut, as shown in the drawings. In either case the means for locating the graduated disk are of a permanent nature and do not require any change in the location of the key-seat in the disk. The main frame or rest K has an opening K', by means of which it is swiveled on or has a pivotal connection with the stem I. Said frame is secured in such position by a collar M and nut N, clamping firmly to the tool-holder A of the lathe-carriage. The supporting part O of said frame contains the tool-holder P, which is moved in and out thereof by turning a hand-wheel P' or a crank in the usual manner, and said tool-holder can be locked in position when necessary by clamping-bolt Q, which presses together the slot $d$ in the side of said supporting portion O. Said slotted part is shown in Fig. 2.

While I have described my invention particularly in reference to boring or cutting tapers, I wish also to state that a straight hole may be bored by means thereof. In boring a straight hole the attachment is set parallel with the centers. In cutting a taper the said attachment is adjusted on its pivot to obtain the desired degree. It will be seen that this attachment is therefore capable of a broad range of adjustment. For center-work the tool-holding portion P is located directly over the pivot, which is essential in order to obtain greater strength and adaptability for work on centers. Such variations, however, do not necessitate any departure from the main feature of the invention, which consists in a detachable taper attachment by means of which any degree within the circle may be cut. (See Figs. 6 and 7.) In this adaptation to heavier work the tool-holder P is flat and is cut down from the top side, as at P'', for location of the tool-post Q, which is a common feature of lathes.

Having described my invention, I claim—

1. The combination with a tool-holder A, of a detachable attachment for cutting tapers on lathes, the same consisting of two pivotally-united parts, to wit: a tool-supporting frame, and a main frame or rest K; a disk having a graduated scale thereon, and means for detachably connecting said rest K, and disk to the tool-holder A, substantially as described.

2. The combination with a tool-holder A of a lathe, of a tool-support consisting of two pivotally-united parts, a graduated disk having the degrees of a circle marked thereon, binding parts by means of which the stationary member of the tool-support, and the graduated disk are detachably united to the tool-holder A, a bolt rigidly projected from one of said binding parts and upon which the graduated disk is fixed, and upon which the pivotal member of the tool-support is pivoted, substantially as described.

3. The combination with a tool-holder A of a lathe, of a tool-support consisting of pivotal and stationary parts, a graduated disk having the degrees in a circle marked thereon, a bolt or stem forming a rigid support for said disk and a pivotal support for the pivotal member of the tool-support, and friction-pieces for securing said bolt to the tool-holder A, substantially as described.

4. A taper-cutting attachment for lathes, comprising a pivotal frame for holding the cutting-tool, and adapted to be moved in a circle, a graduated disk having marks indicating the degrees in the circle, a stem or bolt to which said disk is fixed and to which said frame is pivoted above the disk and on one side of the tool-holding portion, and friction-pieces to one of which said bolt or stem is fixed, and a draw-bolt passing through said friction-pieces and adapted to expand the same and thereby secure the attachment to a lathe.

In testimony whereof I affix my signature in presence of two witnesses.

THOMAS J. PERRIN.

Witnesses:
R. J. McCARTY,
JOHN W. KALBFUS.